(12) United States Patent
Yamamoto et al.

(10) Patent No.: US 11,711,474 B2
(45) Date of Patent: Jul. 25, 2023

(54) READING DEVICE AND IMAGE FORMING APPARATUS

(71) Applicants: Taiki Yamamoto, Ibaraki (JP); Yusuke Tokunaga, Kanagawa (JP); Yuichiro Maeyama, Kanagawa (JP); Kiyoshi Hata, Tokyo (JP)

(72) Inventors: Taiki Yamamoto, Ibaraki (JP); Yusuke Tokunaga, Kanagawa (JP); Yuichiro Maeyama, Kanagawa (JP); Kiyoshi Hata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/848,412

(22) Filed: Jun. 24, 2022

(65) Prior Publication Data
US 2023/0030207 A1 Feb. 2, 2023

(30) Foreign Application Priority Data
Jul. 29, 2021 (JP) .................................. 2021-123977

(51) Int. Cl.
*H04N 1/00* (2006.01)
*H04N 1/024* (2006.01)

(52) U.S. Cl.
CPC ........... *H04N 1/0057* (2013.01); *H04N 1/0249* (2013.01); *H04N 1/00814* (2013.01)

(58) Field of Classification Search
CPC ... H04N 1/401; H04N 1/193; H04N 2201/044; H04N 1/1013; H04N 1/12; H04N 1/40; H04N 2201/0081; H04N 1/121; H04N 1/125; H04N 1/4076; H04N 1/4078; H04N 1/46; H04N 2201/0446; H04N 1/00596; H04N 1/00602; H04N 1/00912; H04N 1/0464; H04N 1/1017; H04N 1/1026;
(Continued)

(56) References Cited

U.S. PATENT DOCUMENTS 5,202,773 A * 4/1993 Kato ................... H04N 1/4078
358/461
5,278,667 A * 1/1994 Takahashi ........... H04N 1/4078
358/445
(Continued)

FOREIGN PATENT DOCUMENTS

JP 2002-101266 A 4/2002
JP 2015-119388 A 6/2015
(Continued)

OTHER PUBLICATIONS

Extended European Search Report issued Dec. 13, 2022 in European Patent Application No. 22180474.3, 10 pages.

*Primary Examiner* — Negussie Worku
(74) *Attorney, Agent, or Firm* — Xsensus LLP

(57) ABSTRACT

A reading device and an image forming apparatus. The reading device includes a reader disposed at a scanning position, the reader being configured to read an image formed on a surface of a sheet, a movement mechanism to move the reader between the scanning position and a separated position away from the scanning position, and a reference plate disposed at a first position facing a reading face of the reader, the reference plate being configured to obtain a reference value to be used when the reader reads the image. In the reading device, the reference plate rotates around an axis from a second position facing a side of the reader to the first position or from the first position to the second position in conjunction with movement of the reader from the scanning position to the separated position by the movement mechanism The image forming apparatus includes the reading device.

10 Claims, 4 Drawing Sheets

(58) Field of Classification Search
CPC ......... H04N 1/123; H04N 1/128; H04N 1/486; H04N 2201/0082; H04N 2201/042; H04N 2201/0471; H04N 2201/04732; H04N 1/00082; H04N 1/00204; H04N 1/0032; H04N 1/00885; H04N 1/00901; H04N 1/00909; H04N 1/00925; H04N 1/00928; H04N 1/00931; H04N 1/0402; H04N 1/0446; H04N 1/0473; H04N 1/0607; H04N 1/103; H04N 1/1043; H04N 1/1052; H04N 1/1135; H04N 1/1215; H04N 1/1911; H04N 1/203; H04N 1/2032; H04N 1/3263; H04N 1/32667; H04N 1/508; H04N 2201/0094; H04N 2201/02425; H04N 2201/0408; H04N 2201/0416; H04N 2201/0418; H04N 2201/0448; H04N 2201/0456; H04N 2201/04729; H04N 2201/04731; H04N 2201/04734; H04N 2201/04739; H04N 2201/04744; H04N 2201/04746; H04N 2201/04786; H04N 2201/04789; H04N 2201/04791; H04N 2201/33328; B41J 11/006; B41J 11/0095; G03G 21/046; G03G 2215/00324; G05B 19/404; G02B 27/58; B23K 26/00; B23K 26/08; B23K 26/0853; B23K 26/0876; H01S 3/005

USPC ........................................................ 358/461
See application file for complete search history.

(56) References Cited

U.S. PATENT DOCUMENTS

| | | | |
|---|---|---|---|
| 7,782,504 B2* | 8/2010 | Okubo et al. ...... | H04N 1/00602 399/361 |
| 2003/0038983 A1* | 2/2003 | Tanabe et al. ......... | H04N 1/401 358/461 |
| 2010/0073739 A1* | 3/2010 | Sekiguchi et al. ....... | H04N 1/40 358/474 |
| 2011/0102864 A1* | 5/2011 | Ishikawa ........... | H04N 1/00649 358/498 |
| 2013/0134667 A1* | 5/2013 | Nakayama .............. | B65H 5/06 271/275 |
| 2017/0214816 A1* | 7/2017 | Yamakawa et al. ... | H04N 1/125 |
| 2019/0283992 A1* | 9/2019 | Maeyama .............. | B65H 5/226 |
| 2020/0039772 A1* | 2/2020 | Miyagawa .............. | B65H 7/16 |
| 2020/0156889 A1 | 5/2020 | Egawa | |
| 2020/0165088 A1 | 5/2020 | Maeyama | |

FOREIGN PATENT DOCUMENTS

| | | |
|---|---|---|
| JP | 2016-105546 A | 6/2016 |
| WO | 2017/169507 A1 | 2/2019 |

* cited by examiner

READING DEVICE AND IMAGE FORMING APPARATUS

CROSS-REFERENCE TO RELATED APPLICATION

This patent application is based on and claims priority pursuant to 35 U.S.C. §119(a) to Japanese Patent Application No. 2021-123977, filed on Jul. 29, 2021, in the Japan Patent Office, the entire disclosure of which is hereby incorporated by reference herein.

BACKGROUND

Technical Field

Embodiments of the present disclosure relate to a reading device that reads the image formed on a surface of a sheet, and an image forming apparatus that includes the reading device.

Background Art

In the related art, image forming apparatuses such as inkjet printers provided with a reading device or an image scanner that reads the image formed on a surface of a sheet such as a recording medium are known. Such a reading device in the related art moves a reference plate such as a base member and a base white plate to a facing position at a prescribed timing, and performs calibration on the reader.

Further, technologies are known in the art in which the reference plate is configured to rotate along a side or the reading face of the reader.

However, in the related art, when the reference plate comes into sliding contact with the reader, the reader or the to-be-scanned surface of the reference plate tends to be damaged, and there is a possibility that calibration of the reader cannot efficiently be performed.

SUMMARY

Embodiments of the present disclosure described herein provide a reading device and an image forming apparatus. The reading device includes a reader disposed at a scanning position, the reader being configured to read an image formed on a surface of a sheet, a movement mechanism configured to move the reader between the scanning position and a separated position away from the scanning position, and a reference plate disposed at a first position facing a reading face of the reader, the reference plate being configured to obtain a reference value to be used when the reader reads the image. In the reading device, the reference plate is configured to rotate around an axis from a second position facing a side of the reader to the first position or from the first position to the second position in conjunction with movement of the reader from the scanning position to the separated position by the movement mechanism or movement of the reader from the separated position to the scanning position, and the reader includes an abutment part contacting the reference plate when the reference plate rotates around the axis, and the abutment part maintains clearance between the reader and the reference plate. The image forming apparatus includes the reading device.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
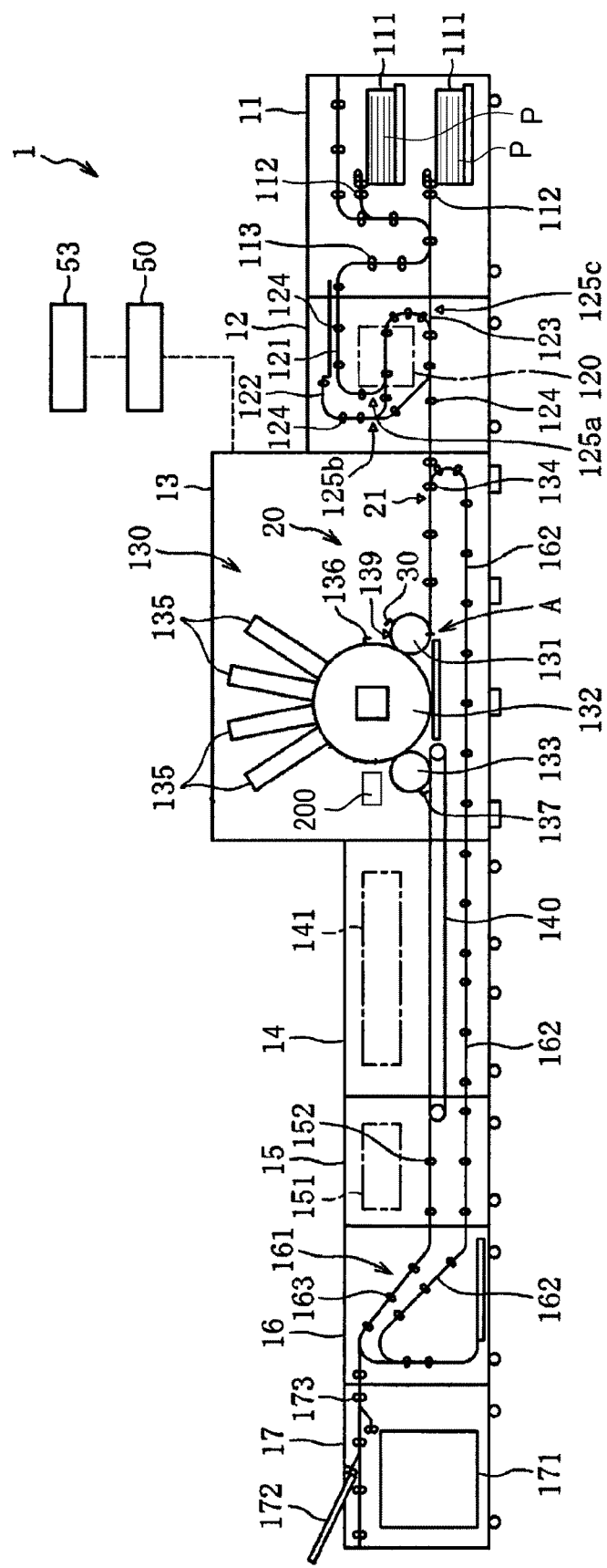
FIG. 1 is a diagram illustrating an overall configuration of an imaging system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present disclosure are described below in detail with reference to the drawings. In the drawings, like reference signs denote like elements, and overlapping description may be simplified or omitted as appropriate.

FIG. 1 is a diagram illustrating an overall configuration of an imaging system 1 according to an embodiment of the present disclosure.

Firstly, an overall configuration and operation of the imaging system 1 is described below with reference to FIG. 1.

As illustrated in FIG. 1, the imaging system 1 according to the present embodiment is provided with a sheet feeder 11, a pretreatment device 12, an image forming apparatus 13, a drying device 14, a cooler 15, a reversing device 16, a sheet ejector 17, a sheet conveyance device 20, a controller 50, and an operation panel 53.

The sheet feeder 11 is provided with a sheet tray 111 on which a plurality of sheets P are stacked, a feeding device 112 that feeds the sheet P from the sheet tray 111, and a plurality of conveyance roller pairs 113 that convey the fed sheet P. The multiple sheets P that are stacked in the sheet tray 111 are separated on a one-piece-by-one-piece basis by the feeding device 112, and then sent to the pretreatment device 12 by the multiple conveyance roller pairs 113.

The pretreatment device 12 is a device that performs predetermined pretreatment on the sheet P on which an image is not yet formed. More specifically, the pretreatment device 12 is provided with a treatment liquid applicator 120 that applies a treatment liquid such as a chemical agent that reacts with ink to prevent bleeding. Moreover, the pretreatment device 12 according to the present embodiment includes a first conveyance path 121 through which the sheet P conveyed from the sheet feeder 11 is conveyed to the treatment liquid applicator 120, a second conveyance path 122 in which the front and back sides of the sheet P conveyed through the treatment liquid applicator 120 is turned and through which the sheet P is conveyed to the treatment liquid applicator 120 again, and a third conveyance path 123 through which the sheet P is conveyed to the image forming apparatus 13 without passing the sheet P through the treatment liquid applicator 120. In these conveyance paths 121, 122, and 123, a plurality of conveyance roller pairs 124 that convey the sheet P and a plurality of sheet sensors 125a to 125c that detect the sheet P that is being conveyed are arranged.

When the treatment liquid is applied to the sheet P, the sheet P is conveyed to the treatment liquid applicator 120 through the first conveyance path 121. In such cases, the sheet P is stopped on a temporary basis when detected by a sheet sensor 125a arranged on the first conveyance path 121, and then conveyed to the treatment liquid applicator 120 at a prescribed timing. After the treatment liquid is applied to one of the two sides of the sheet P by the treatment liquid applicator 120. and the sheet P is conveyed to the image forming apparatus 13.

When the treatment liquid is applied to both sides of the sheet P, the sheet P on one side of which the treatment liquid has been applied is conveyed to the second conveyance path 122. As the sheet P is switched back in the second conveyance path 122, the front and back sides of the sheet P is turned, and sent again to the treatment liquid applicator 120. In such cases, the sheet P is stopped on a temporary basis when detected by a sheet sensor 125b arranged on the second conveyance path 122, and then conveyed to the treatment liquid applicator 120 at a prescribed timing. The treatment liquid is applied to the rear side of the sheet P by the treatment liquid applicator 120, and the sheet P is conveyed to the image forming apparatus 13.

When the sheet P is conveyed to the image forming apparatus 13 without being treated with the treatment liquid, the sheet P is conveyed through the third conveyance path 123. In such cases, the sheet P is stopped on a temporary basis when detected by a sheet sensor 125c arranged on the third conveyance path 123, and then conveyed to the image forming apparatus 13 at a prescribed timing.

The image forming apparatus 13 according to the present embodiment is provided with an image forming device 130 that serves as an ink discharging unit and discharges ink droplets onto the sheet P, and a first transfer barrel 131, a conveying drum 132, a second transfer barrel 133, and a plurality of conveyance roller pairs 134 that together serve as a conveyor and conveys the sheet P.

The image forming device 130 according to the present embodiment is provided with a plurality of recording heads 135 that can handle a plurality of colors, and discharges ink of a plurality of colors to form an image on the sheet P. Each one of such multiple recording heads may be referred to as a liquid discharge head in the following description.

Figure 2A:
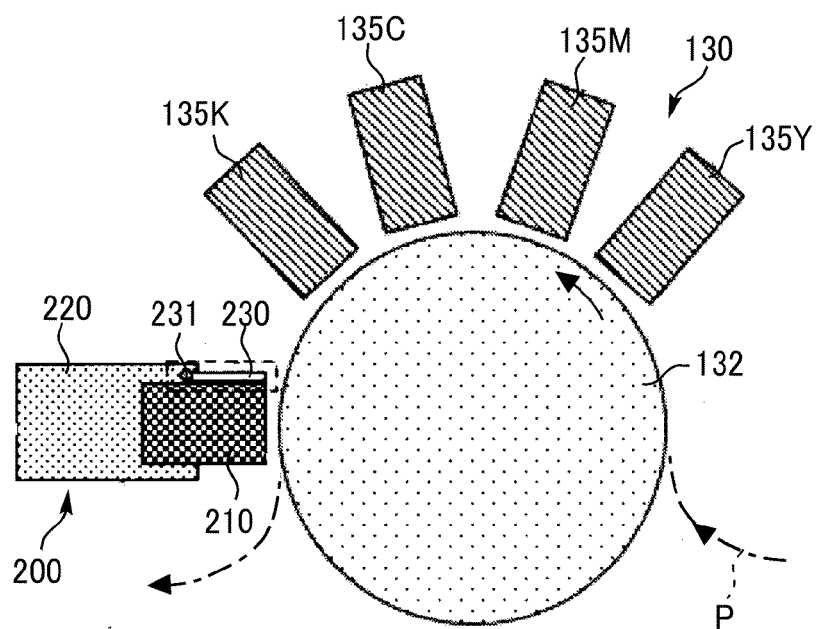
FIG. 2A and FIG. 2B are diagrams each illustrating the operation of a reading device provided for an image forming apparatus, according to an embodiment of the present disclosure.
Figure 2B:
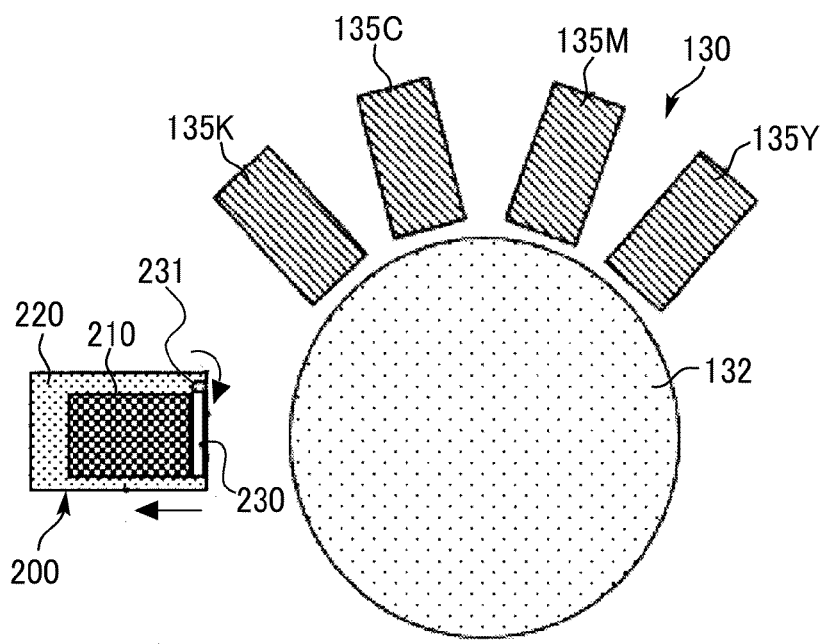

FIG. 2A and FIG. 2B are diagrams each illustrating the operation of the reading device 200 provided for the image forming apparatus 13, according to the present embodiment.

Each one of the multiple recording heads 135 is a functional component that discharges and sprays liquid from discharge holes or nozzles. As illustrated in FIG. 2A and FIG. 2B, in the present embodiment, a recording head 135Y that discharges yellow (Y) ink, a recording head 135M that discharges magenta (M) ink, a recording head 135C that discharges cyan (C) ink, and a recording head 135K that discharges black (K) ink are arranged in parallel in the direction of rotation of the conveying drum 132 and in the direction of conveyance of the sheet P. More specifically, these recording heads are arranged in a counterclockwise direction as illustrated in FIG. 1, FIG. 2A, and FIG. 2B from an upstream portion to a downstream portion of the conveying drum 132 in the order listed.

The discharging operation of each one of the multiple recording heads 135Y, 135M,135C, and 135K that handle liquid of four colors is controlled by the driving signals that are based on the image data. The recording heads 135Y, 135M, 135C, and 135K discharge the ink of multiple colors onto the front side of the sheet P being conveyed by the conveying drum 132 by superimposing multiple images on top of one another. As a result, a color image is formed on the front side of the sheet P as desired.

In the present embodiment, the multiple recording heads 135Y, 135M, 135C, and 135K of four colors of yellow (Y), magenta (M), cyan (C), and black (K) are arranged. However, no limitation is indicated thereby, and the number of the recording heads or the colors of the recording heads are not limited to the above configuration or structure. For example, recording heads of six colors may be arranged, or recording heads that discharge ink of special colors such as white, gold, and silver may be arranged.

The sheet P that is conveyed from the pretreatment device 12 is conveyed by the conveyance roller pair 134, and is passed to the first transfer barrel 131, the conveying drum 132, and the second transfer barrel 133 in the order listed. All of the first transfer barrel 131, the conveying drum 132, and the second transfer barrel 133 has a cylindrical shape elongated in the axial direction.

Grippers 30, 136, and 137 that grip and receive the front end of the sheet P are disposed on the peripheral surfaces of the first and second transfer barrels 131 and 133 and the conveying drum 132, respectively. Each one of the multiple grippers 30, 136, and 137 is a grip that grips the front end of the sheet P, and also serves as a receiver that receives the sheet P.

In the image forming apparatus 13 or the imaging system 1 according to the present embodiment, as illustrated in FIG. 1, FIG. 2A, and FIG. 2B, the reading device 200 is arranged downstream from the multiple recording heads 135Y, 135M, 135C, and 135K at a position facing the conveying drum 132 that serves as a conveyor. The reading device 200 according to the embodiments reads an image formed on the surface of the sheet P. The reading device 200 will be described later in more detail with reference to, for example, FIG. 2A, FIG. 2B, FIG. 3A, FIG. 3B, FIG. 4, and FIG. 5.

Subsequently, the sheet P on which the image is formed by the image forming apparatus 13 is conveyed to the drying device 14 by the conveyance belt 140.

The image on the surface of the sheet P that is conveyed to the drying device 14 is dried by a dryer 141. The sheet P whose image thereon has been dried passes through the conveyance path 152, and is conveyed to the cooler 15.

The image on the surface of the sheet P that is conveyed to the cooler 15 is dried by a cooling unit 151 The sheet P whose image thereon has been cooled is conveyed to the sheet ejector 17 through the conveyance path 163 in the reversing device 16. Finally, a plurality of sheets P are stacked on the output tray 172 or the large-capacity output tray 171 of the sheet ejector 17.

Thus, a series of operations in the imaging system 1 is completed.

When a double-sided printing mode is selected, images need to be formed on both sides of the sheet P. In order to achieve such functions, the sheet P that is conveyed to the reversing device 16, which is the sheet P whose image on the front side has been dried, is reversed by reversing the direction of conveyance by the reversing device 16, and then is conveyed to a double-sided printing path 162, and then is conveyed to the image forming apparatus 13 again. The sheet P on the other side or rear side of which the desired image has been formed in the image forming apparatus 13 passes through the drying device 14, the cooler 15, and the reversing device 16, and is stacked on the output tray 172 or the large-capacity output tray 171 of the sheet ejector 17.

The reading device 200 in the image forming apparatus 13 or the imaging system 1 according to the present embodiment will be described in detail with reference to, for example, FIG. 2A, FIG. 2B, FIG. 3A, FIG. 3B, and FIG. 4.

As described above with reference to, for example, FIG. 1, the image forming apparatus 13 according to the present embodiment includes, for example, the conveying drum 132 that serves as a conveyor and conveys the sheet P in a predetermined conveyance direction, and the multiple recording heads 135Y, 135M, 135C, and 135K that discharge ink droplets onto the surfaces of the sheet P conveyed in the direction of conveyance by the conveying drum 132, which serves as a conveyor, to form an image.

The reading device 200 according to the present embodiment is arranged downstream from the multiple recording heads 135Y, 135M, 135C, and 135K in the direction of conveyance. The reading device 200 according to the embodiments reads an image formed on the surface of the sheet P. For example, the recording heads 135Y, 135M, 135C, and 135K are adjusted and controlled based on the image read by the reading device 200. As a result, the color tone, the color shift, and the magnifying power of the image that is formed on the front side of the sheet P are corrected.

As illustrated in, for example, FIG. 2A, FIG. 2B, FIG. 3A, FIG. 3B, and FIG. 4, the reading device 200 according to the present embodiment includes, for example, a reader 210, a base unit 220, a movement mechanism, a reference plate 230, and a pulling spring 240 that serves as a pressurizing member.

Figure 3A:
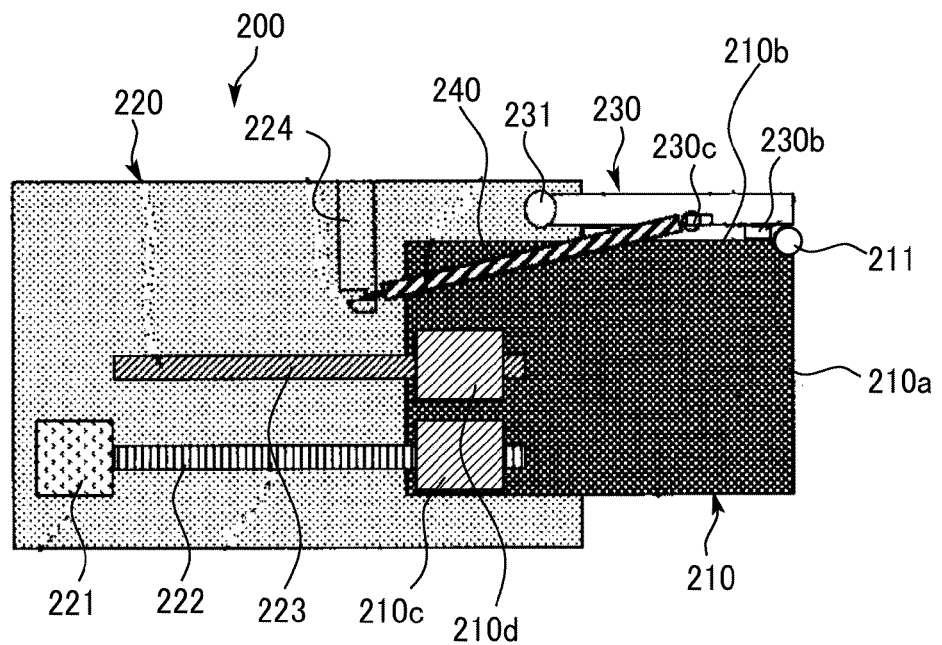
FIG. 3A and FIG. 3B are diagrams each illustrating how a reader and a reference plate operate in a reading device, according to an embodiment of the present disclosure.
Figure 3B:
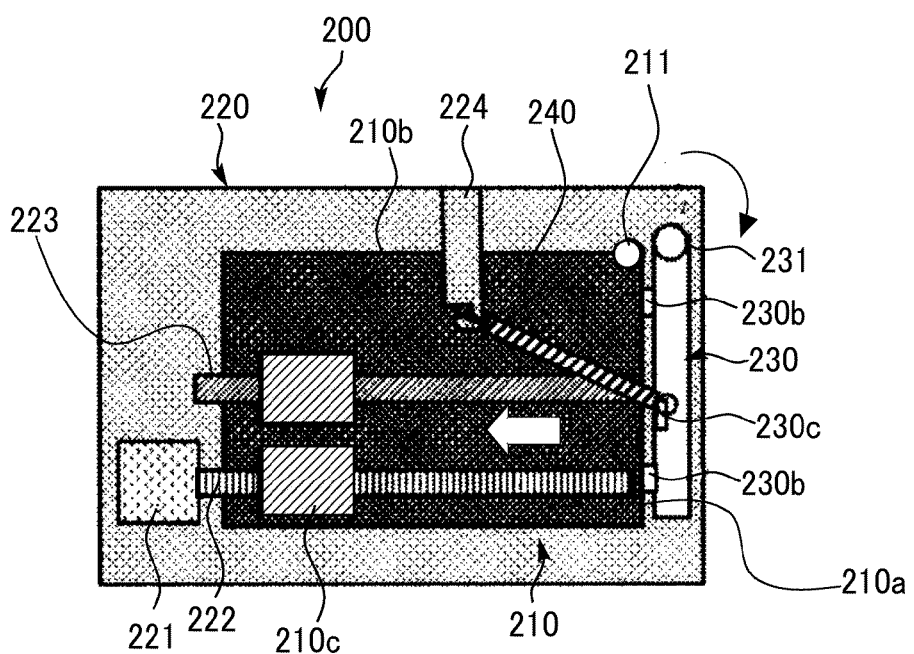

FIG. 3A and FIG. 3B are diagrams each illustrating how the reader 210 and the reference plate 230 operate in the reading device 200, according to the present embodiment.

The reader 210 according to the present embodiment is a scanner that reads the image formed on one surface of the sheet P when the sheet P is placed at a scanning position as illustrated in FIG. 2A and FIG. 3A.

More specifically, as illustrated in FIG. 2A and FIG. 3A, when the reader 210 that serves as a scanner is located at the scanning position, the reading face 210a gets close to the conveying drum 132 (see FIG. 2A). Due to such a configuration, the image that is formed on the front side of the sheet P can optically be scanned and obtained while the sheet P is passing through a gap between the conveying drum 132 and the reading face 210a of the reader 210.

The reader 210 is held by the base unit 220 fixedly installed in the image forming apparatus 13, in a movable manner in the right and left directions as illustrated in FIG. 2A, FIG. 2B, FIG. 3A, and FIG. 3B so as to get close to or separated from the conveying drum 132.

The movement mechanism moves the reader 210 between the scanning position as illustrated in FIG. 2A and FIG. 3A and the separated position separated from the scanning position as illustrated in FIG. 2B and FIG. 3B.

More specifically, the movement mechanism is composed of, for example, a motor 221, a feed screw 222, and a slide rail 223. The motor 221 drives the feed screw 222 to rotate in both forward and reverse directions, and is fixed to the base unit 220 that is fixedly arranged in the image forming apparatus 13. The feed screw 222 is threadably fitted to the female screw formed on a first projecting part 210c protruding from the top face of the reader 210. The slide rail 223 is fixedly installed on the base unit 220, and is slidably fitted into the hole formed in a second projecting part 210d protruding from the top face of the reader 210. The feed screw 222 and the slide rail 223 are both formed so as to extend in the right and left directions as illustrated in FIG. 3A and FIG. 3B.

With the movement mechanism configured as described above, when the motor 221 rotates in the forward direction under the control of the controller 50, the reader 210 moves from the scanning position as illustrated in FIG. 3A to the separated position as illustrated in FIG. 3B. With the movement mechanism configured as described above, when the motor 221 rotates in the reverse direction under the control of the controller 50, the reader 210 moves from the separated position as illustrated in FIG. 3B to the scanning position as illustrated in FIG. 3A.

The reference plate 230 according to the present embodiment is placed at the first position that is a closed position facing the reading face 210a of the reader 210 as illustrated in FIG. 3B, and is a used to obtain a reference value to be used when the reader 210 performs the scanning.

Figure 5:
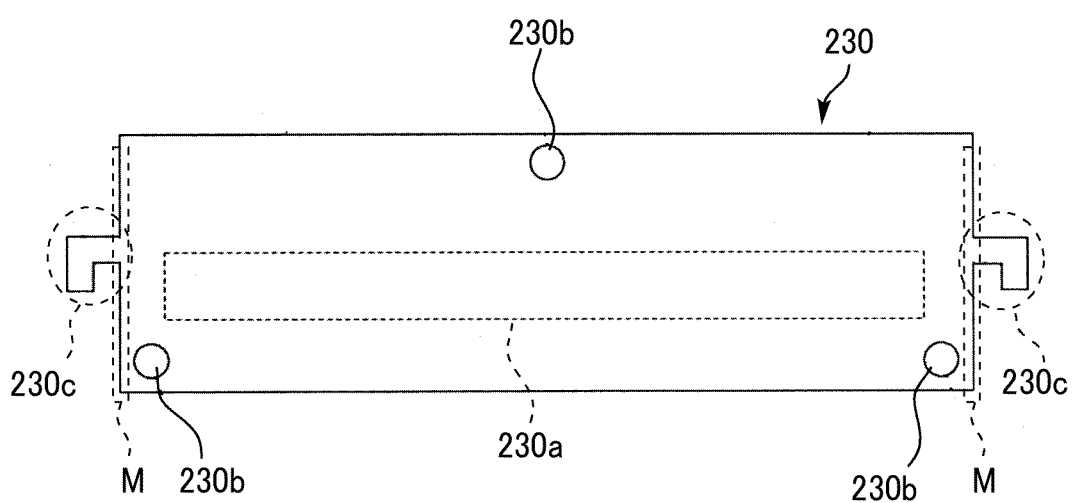
FIG. 5 is a top view of a reference plate according to an embodiment of the present disclosure.

More specifically, as illustrated in FIG. 5, the reference plate 230 according to the present embodiment is an approximately rectangular metallic plate, and has a to-be-scanned surface 230a formed on a portion of its surface. The to-be-scanned surface 230a is a portion that is directly scanned and read by the reader 210, and is coated in white in the present embodiment. As illustrated in FIG. 3B, the reader 210 is calibrated at a prescribed timing when the reference plate 230 that serves as a base white plate faces the reading face 210a of the reader 210. For example, the reader 210 is calibrated at a warm-up timing before the image-forming operation starts.

The reference plate 230 is held by the base unit 220 so as to be rotatable around a pair of axes 231. This configuration or structure will be described below in detail.

The pulling spring 240 serves as a pressurizing member that pressurizes and brings the reference plate 230 close to the reader 210.

More specifically, the pulling spring 240 according to the present embodiment has a hook on one end side coupled to one of a pair of latches 230c of the reference plate 230, and the other end of the pulling spring 240 is coupled to a notch of a bent portion 224. As illustrated in FIG. 3A, FIG. 3B, and FIG. 5, the pair of latches 230c are arranged at positions apart from the pair of axes 231. As illustrated in FIG. 3A and FIG. 3B, the bent portion 224 in a portion bent so as to protrude from the base unit 220. The pulling spring 240 according to the present embodiment applies pressure to the reference plate 230 such that the reference plate 230 rotates around the pair of axes 231 in a clockwise direction as illustrated in FIG. 3A and FIG. 3B, The notch of the bent portion 224 is disposed at the lower left of the latch 230c as illustrated in FIG. 3A when the reference plate 230 is located at the second position as illustrated in FIG. 3A, and the pulling spring 240 applies pressing force to rotate the reference plate 230 around the pair of axes 231 in a clockwise direction as illustrated in FIG. 3A. Accordingly, as will be described later, the contact of the reference plate 230 with a pair of cam followers 211 is facilitated when the reference plate 230 rotates around the pair of axes 231, and the contact of the multiple bosses 230b with the reader 210 when the reference plate 230 is positioned at the first position is facilitated.

In the present embodiment, the reading device 200 according to the present embodiment is configured such that the reference plate 230 rotates around the pair of axes 231 from the second position (or the first position) facing the side 210b of the reader 210 to the first position (or the second position) in conjunction with the movement of the reader 210 from the scanning position as illustrated in FIG. 3A (or the separated position) to the separated position as illustrated in FIG. 3B (or the scanning position) by the movement mechanism. The side 210b of the reader 210 may be referred to as a non-reading face in the following description.

In other words, as illustrated in FIG. 3B, when the reader 210 moves from the scanning position toward the separated position in the direction indicated by the hollow arrow, the reference plate 230 rotates in a clockwise direction around the pair of axes 231, as indicated by an arrow in FIG. 3B, due to the pressure applied by the pulling spring 240, from the second position as illustrated in FIG. 3A toward the first position as illustrated in FIG. 3B. The first position and the second position may be referred to as a closed position and an open position, respectively, in the following description.

By contrast, as illustrated in FIG. 3A, when the reader 210 moves from the separated position toward the scanning position, the reference plate 230 rotates in a counterclockwise direction around the pair of axes 231 from the first position as illustrated in FIG. 3B toward the second position illustrated in FIG. 3A so as to run against the pressure applied by the pulling spring 240. In so doing, the reference plate 230 that is located at the first position is not pushed by the reading face 210a of the reader 210 so as to go against the pressure applied by the pulling spring 240, but is pushed by the pair of cam followers 211 as will be described later in detail. Due to this configuration, the reference plate 230 and the reader 210 do not contact each other directly.

Figure 4:
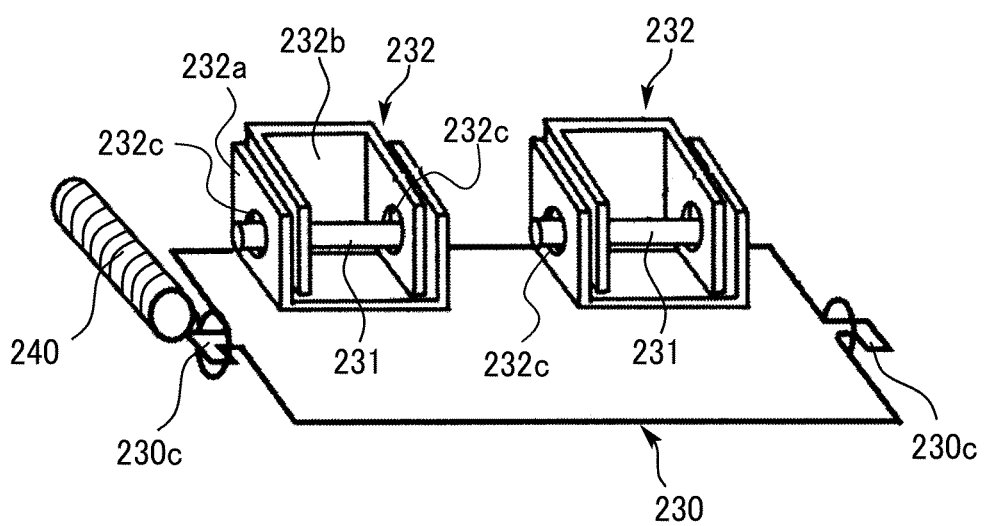
FIG. 4 is a perspective view of a reference plate held by a hinge, according to an embodiment of the present disclosure.

FIG. 4 is a perspective view of the reference plate 230 held by a pair of hinges 232, according to the present embodiment.

More specifically, as illustrated in FIG. 4, the reference plate 230 is fixed to a pair of first members 232a of the pair of hinges 232. The pair of second members 232b of the pair of hinges 232 are fixed to the base unit 220. The pair of axes 231 are inserted into the multiple holes 232c of the first member 232a and the second member 232b. Each one of the pair of axes 231 according to the present embodiment is provided with a pair of retaining rings whose outside diameter is wider than the diameter of the multiple holes 232c at both ends in the axial direction so as not to fall off from the corresponding one of the pair of hinges 232. In other words, such a pair of retaining rings are arranged at both outer ends of the corresponding one of the pair of hinges 232.

Due to such a configuration as above, the reference plate 230 rotates around the pair of axes 231.

For the sake of explanatory convenience, the relative positions of the pair of axes 231 and the reference plate 230 as illustrated in FIG. 2A, FIG. 2B, FIG. 3A, and FIG. 3B are different from the relative positions of the pair of axes 231 and the reference plate 230 as illustrated in FIG. 4. However, no limitation is indicated thereby, and it is satisfactory as long as the reference plate 230 rotates around the pair of axes 231 in any one of the above drawings.

As illustrated in FIG. 3A and FIG. 2A, when the reader 210 is positioned at the scanning position and the reference plate 230 releases the reading face 210a, the image of the sheet P that passes through the position facing the reading face 210a is scanned and read by the reader 210. Based on the results of scanning, each element related to the image formation is adjusted and controlled.

By contrast, as illustrated in FIG. 3B and FIG. 2B, when the reader 210 is positioned at the separated position and the reference plate 230 releases the reading face 210a, the reference plate 230 that serves as a to-be-scanned surface and faces the reading face 210a is scanned and read by the reader 210. The reader 210 is calibrated based on the results of the above scanning or reading.

The reader 210 can be calibrated using a method similar to the methods known in the art. For example, the radiation intensity of the light to be output from the reader 210 is adjusted such that the output level of the reader 210 has a predetermined value when the to-be-scanned surface 230a that is in white is read.

As described above, in the reading device 200 according to the present embodiment, the reference plate 230 is configured to be rotatable around the pair of axes 231 along the side 210b or the reading face 210a of the reader 210. Due to such a configuration, compared with cases in which the reference plate is configured to be slidable in the conveyance direction of the sheet, the space in which the reference plate 230 is movable can be saved. In particular, the space in the conveyance direction of the sheet P can be saved. In particular, as a plurality of members such as the plurality of recording heads 135 are disposed around the conveying drum 132 and space in the sheet P conveyance direction is limited, the configuration according to the present embodiment is useful.

As illustrated in FIG. 3A and FIG. 3B, the reader 210 according to the present embodiment is provided with the pair of cam followers 211 that together serve as an abutment part or a rotor. The pair of cam followers 211 according to the present embodiment contact the reference plate 230 when the reference plate 230 rotates around the pair of axes 231, and maintains the clearance or space between the reader 210 and the reference plate 230.

Due to this configuration, even if the reference plate 230 is configured to rotate around the pair of axes 231 along the side 210b or the reading face 210a of the reader 210, the reference plate 230 is less likely to come into sliding contact with the reader 210 and the reader 210 or the reference plate 230 is less likely unintentionally damaged. Accordingly, the reader 210 can be stably and favorably calibrated over time.

More specifically, the pair of cam followers 211 are rotatably installed at a corner where the reading face 210a and the side 210b intersect with each other in the reader 210. More specifically, the pair of cam followers 211 are arranged so as to protrude from both the reading face 210a and the side 210b at the above-described corner.

As illustrated in FIG. 3A, when the reader 210 is located at the scanning position, the pair of cam followers 211 according to the present embodiment contact around the front end of the reference plate 230. Such a front end of the reference plate 230 is at a position farthest from the pair of axes 231.

Once the reader 210 starts moving from the scanning position as illustrated in FIG. 3A toward the separated position as illustrated in FIG. 3B, the reference plate 230 rotates around the pair of axes 231 while contacting the peripheral surfaces of the pair of cam followers 211 that are approximately cylindrical. In the above configuration, the pair of cam followers 211 intervene between the reference plate 230 and the reader 210 without exception. Accordingly, the clearance between the reference plate 230 and the reader 210 is kept constant, and the reference plate 230 and the reader 210 do not contact each other. As the pair of cam followers 211 are rotated by frictional resistance with the reference plate 230, the wear and tear of the reference plate 230 and the pair of cam followers 211 are reduced.

At a timing immediately before the reader 210 reaches the separated position as illustrated in FIG. 3B, the contact between the pair of cam followers 211 and the reference plate 230 is released. After that, the reader 210 reaches the separated position as illustrated in FIG. 3B, and the reference plate 230 reaches the first position. In other words, the pair of cam followers 211 do not contact the reference plate 230 during the entire process from the second position of the reference plate 230 where the rotation starts to the first position of the reference plate 230 where the rotation terminates, but the pair of cam followers 211 contact the reference plate 230 during a certain process.

When the reader 210 moves from the separated position as illustrated in FIG. 3B toward the scanning position as illustrated in FIG. 3A, an operation in reverse order to the above operation is performed.

According to the present embodiment as described above, for example, the separated position of the reader 210, the shape or arrangement of the pair of cam followers 211, and the trajectory of the rotation of the reference plate 230 are set or adjusted such that the pair of cam followers 211 that together serve as an abutment part does not contact the reference plate 230 when the reference plate 230 is located at the first position as illustrated in FIG. 3B.

As illustrated in FIG. 3B, in the reference plate 230 that is located at the first position, the multiple bosses 230b that are arranged on the reference plate 230 contacts the reading face 210a of the reader 210. Due to this configuration, the distance between the reference plate 230 that serves as a to-be-scanned surface and the reading face 210a of the reader 210 is determined.

In other words, in the present embodiment, the reference plate 230 is provided with a plurality of bosses 230b that contact the reader 210 when the reference plate 230 is at the first position. Due to such bosses, the distance between the reference plate 230 and the reading face 210a can be kept constant.

Due to such a configuration, the reader 210 can stably be calibrated with a high degree of accuracy using the reference plate 230.

FIG. 5 is a top view of the reference plate 230, according to the present embodiment.

More specifically, as illustrated in FIG. 5, the multiple bosses 230b are three bosses 230b that are arranged as if they draw a triangle on the surface of the reference plate 230, and are arranged on the reference plate 230 outside the region of the to-be-scanned surface 230a to be scanned or read by the reader 210.

As described above, the three bosses 230b that are arranged as if they draw a triangle are used in the present embodiment. Due to such a configuration, the reference plate 230 can be supported at three points with respect to the reading face 210a of the reader 210. Accordingly, compared with a case in which a plurality of bosses 230b are arranged in a straight line, the position of the reference plate 230 relative to the reader 210 can be determined with desired balance.

As the multiple bosses 230b are arranged outside the region of the to-be-scanned surface 230a, the multiple bosses 230b do not interfere with the reading operation performed by the reader 210 on the to-be-scanned surface 230a.

As illustrated in FIG. 4 and FIG. 5, in the present embodiment, backlash or space is formed between the pair of axes 231 and the multiple holes 232c that are formed on the pair of hinges 232 and rotatably hold the pair of axes 231.

In other words, the pair of axes 231 are not tightly inserted into the multiple holes 232c without backlash or play, but are rather loosely inserted with some space or play.

Due to such a configuration, as described above, when the reference plate 230 reaches the first position as illustrated in FIG. 3B, the pair of cam followers 211 that were contacting the reference plate 230 is separated from the reference plate 230, and the position of the reference plate 230 relative to the reading face 210a is smoothly determined by the three bosses 230b.

As illustrated in FIG. 5, the positions or the like of the pair of cam followers 211 that together serve as an abutment part are determined so as to contact portions of the reference plate 230 outside the region of the to-be-scanned surface 230a to be scanned or read by the reader 210 on the reference plate 230. Such portions of the reference plate 230 outside the region of the to-be-scanned surface 230a may be referred to as regions M as illustrated in FIG. 5.

More specifically, the pair of cam followers 211 are disposed so as to be able to contact both ends in the width direction of the reference plate 230. The pair of cam followers 211 contact the reference plate 230 while moving to the reference plate 230 within a range from the lower end to the upper end of the regions M as illustrated in FIG. 5 by the rotation of the reference plate.

Due to such a configuration as described above, undesired rubbing on the to-be-scanned surface 230a as the pair of cam followers 211 contact the reference plate 230 can be prevented.

As described above, the reading device 200 according to the present embodiment in the image forming apparatus 13 includes the reader 210 that reads the image formed on one surface of the sheet P when the sheet P is placed at the scanning position, the movement mechanism that moves the reader 210 between the scanning position and a separated position away from the scanning position, and the reference plate 230 that is placed at the first position facing the reading face 210a of the reader 210 and is used to obtain a reference value to be used when the reader 210 performs the scanning. The reading device 200 according to the present embodiment is configured such that the reference plate 230 rotates around the pair of axes 231 from the second position (or the first position) facing the side 210b of the reader 210 to the first position (or the second position) in conjunction with the movement of the reader 210 from the scanning position (or the separated position) to the separated position (or the scanning position) by the movement mechanism. The reader 210 according to the present embodiment is provided with a pair of cam followers 211 that together serves as an abutment part. The pair of cam followers 211 according to the present embodiment contact the reference plate 230 when the reference plate 230 rotates around the pair of axes 231, and maintain the clearance between the reader 210 and the reference plate 230.

Due to such a configuration, the reader 210 and the reference plate 230 can be prevented from being damaged easily.

In the above description, the embodiments of the present disclosure are applied to the reading device 200 provided for the image forming apparatus 13 that serves as an ink-jet printer in the imaging system 1, However, no limitation is intended thereby, and the embodiments of the present disclosure may be applied to, for example, a reading device provided for an image forming apparatus that is not provided for an imaging system, a reading device provided for a mimeographic or silk-screen printer or an electrophotographic image forming apparatus other than an ink-jet printer, a reading device provided for a device or apparatus other than an image forming apparatus, and a reading device that is a stand-alone device and is not provided for any device or apparatus.

Also in such a configuration as above, advantageous effects similar to those of the embodiments as described above can be achieved.

Further, for example, the number, position, and the shape of the above components are not limited to those of the present embodiment, and may be changed to any desired number, position, and shape suitable for implementing the embodiments of the present disclosure.

In the description of the present application or other technical documents, the term sheet is not limited to a sheet of paper, but may be all sorts of the sheet-shaped recording medium such as coated paper, label paper, an overhead projector (OHP) sheet, and a metal sheet.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A reading device comprising:
  a reader disposed at a scanning position, the reader being configured to read an image formed on a surface of a sheet;
  a movement mechanism configured to move the reader between the scanning position and a separated position away from the scanning position; and
  a reference plate disposed at a first position facing a reading face of the reader, the reference plate being configured to obtain a reference value to be used when the reader reads the image,
  wherein the reference plate is configured to rotate around an axis from a second position facing a side of the reader to the first position or from the first position to the second position in conjunction with movement of the reader from the scanning position to the separated position by the movement mechanism or movement of the reader from the separated position to the scanning position, and
  wherein the reader includes an abutment part contacting the reference plate when the reference plate rotates around the axis, and the abutment part maintains clearance between the reader and the reference plate.

2. The reading device according to claim 1, wherein the abutment part does not contact the reference plate when the reference plate is located at the first position.

3. The reading device according to claim 1, wherein the abutment part is a cam follower disposed at a corner where the reading face and the side intersect with each other in the reader.

4. The reading device according to claim 1, wherein the reference plate includes a plurality of bosses contacting the reader when the reference plate is at the first position, and wherein the plurality of bosses keep a distance between the reference plate and the reading face constant.

5. The reading device according to claim 4, wherein the plurality of bosses are three bosses, and wherein the three bosses are disposed to draw a triangle on a surface of the reference plate and are disposed on the reference plate outside a region of a to-be-scanned surface to be read by the reader.

6. The reading device according to claim 1, wherein backlash or space is formed between the axis and a hole rotatably holding the axis.

7. The reading device according to claim 1, further comprising:
  a pressurizing member to pressurize the reference plate toward the reader.

8. The reading device according to claim 1, wherein the abutment part contacts the reference plate outside a region of a to-be-scanned surface of the reference plate to be read by the reader.

9. An image forming apparatus comprising the reading device according to claim 1.

10. The image forming apparatus according to claim 9, further comprising:
  a conveyor configured to convey the sheet in a predetermined conveyance direction; and
  a recording head configured to discharge ink droplets onto a surface of the sheet conveyed in the predetermined conveyance direction by the conveyor, to form an image,
  wherein the reading device is disposed downstream from the recording head in the conveyance direction.

* * * * *